United States Patent [19]

Zwissler

[11] 4,254,600
[45] Mar. 10, 1981

[54] MOUNTING FOR DETACHABLY CONNECTING WALL PANELS AND THE LIKE

[76] Inventor: Ruedi Zwissler, Brauerstrasse 113, 9016 St. Gallen, Switzerland

[21] Appl. No.: 11,651

[22] Filed: Feb. 12, 1979

Related U.S. Application Data

[63] Continuation of Ser. No. 651,276, Jan. 22, 1976, abandoned.

[30] Foreign Application Priority Data

Jan. 22, 1976 [CH] Switzerland .................. 8657/76

[51] Int. Cl.³ .............................................. E04B 1/38
[52] U.S. Cl. ........................................ 52/281; 52/288
[58] Field of Search ................. 52/281, 282, 236.1, 52/288, 285, 284; 160/135, 351

[56] References Cited

U.S. PATENT DOCUMENTS

| 805,993 | 11/1905 | Petz | 5/282 |
| 1,793,503 | 2/1931 | Michaels | 52/288 |
| 3,063,496 | 11/1962 | Kessler | 52/281 |
| 4,005,559 | 2/1977 | Mathou | 52/282 |

FOREIGN PATENT DOCUMENTS

| 2140202 | 2/1973 | Fed. Rep. of Germany | 52/282 |
| 2162388 | 6/1973 | Fed. Rep. of Germany | 52/282 |
| 2258006 | 5/1974 | Fed. Rep. of Germany | 52/282 |
| 919645 | 12/1946 | France | 52/281 |
| 702888 | 4/1966 | Italy | 281/ |

*Primary Examiner*—James L. Ridgill, Jr.
*Attorney, Agent, or Firm*—Larson, Taylor and Hinds

[57] ABSTRACT

Mountings for detachably connecting juxtaposed edges of at least two wall panels that radiate from the mounting are described wherein a jaw member is formed with two jaw surfaces that engage faces of the panels on one side of the panels close to the edges. The two jaw surfaces are spaced apart and an intermediate part either formed in one piece with the jaw member or fixed thereto, is located between the jaw surfaces and between the edges of the panels. The panels are maintained in contact with the jaw surfaces by two further such surfaces on a jaw device engaging faces on the opposite side of the panels. This jaw device is formed with a recess that fits onto the intermediate part and determines the extent of separation of the opposed jaw surfaces. At least one screw fixes the jaw device to the intermediate part. The location of the jaw surfaces determines the angle at which the panels are set relatively to one another. Where a third panel is to be accommodated, the jaw device may be divided into second and third jaw members between which the third panel is located. In a further alternative the intermediate part is a square, pentagonal or hexagonal prism and the jaw device is again divided so that in all four or three jaw members are distributed round the prism and support four or three panels each between a pair of jaw members.

1 Claim, 8 Drawing Figures

MOUNTING FOR DETACHABLY CONNECTING WALL PANELS AND THE LIKE

This is a continuation of application Ser. No. 651,276 filed Jan. 22, 1976, now abandoned.

FIELD OF THE INVENTION

The present invention relates to mountings for detachably connecting members, such as wall panels, edge protectors, or rails by means of jaws pressed together to hold the members in position.

DESCRIPTION OF THE PRIOR ART

Numerous embodiments of such mountings are known and in frequent use. Thus, a mounting of the above-mentioned type is known which comprises two similar jaws between which, in assembled condition, two openings forming a part of a circle or of a cylinder are formed. Within each opening, there is arranged a gripping element provided with an incision for holding an edge of a wall panel. The gripping elements consist of resilient material such as for example hard rubber or polyamide. By more or less firmly pressing the two jaws against each other, the gripping parts are more or less strongly pressed together, and the wall panels to be connected held in grooves in the gripping elements.

Although this known mounting, because of the cylindrical shape of the gripping elements, permits the wall panels to be connected substantially at any angle within a wide range of angles, it has many disadvantages.

Such a disadvantage is, for example, that the mounting is expensive in construction and consists of several coacting parts. A particular disadvantage is that rigid connection of two wall panels is not possible because of the resilient gripping elements. A further disadvantage of the known mountings is that, independently of the angle, only two wall panels can be connected with each other. A further disadvantage is that the known mountings must be exactly positioned since, otherwise, the wall panels to be connected would be directly gripped by the jaws and their surfaces damaged.

Since the gripping elements can be distorted within the jaws, it is furthermore not possible to connect together two wall panels at a precisely determined angle.

It is the purpose of the present invention to avoid the disadvantages of the known mountings and particularly to provide a mounting of the above-mentioned type which permits rigid connection of panels and which also permits the connection of several panels together.

A further purpose of the invention consists in providing a mounting which can be produced economically and which comprises a comparatively small number of individual parts.

A further purpose of the invention consists in providing a mounting by means of which several panels can be rigidly connected together while avoiding undue stresses resulting from non-parallelism of from different distances between the individual panels.

SUMMARY OF THE INVENTION

According to the present invention, this is achieved primarily by providing a first jaw member on which an intermediate part is fixed, and a second jaw device which can be fixed on the intermediate part, the jaw device having at least one recess complementary with the intermediate part for locating the second jaw device on the intermediate part, the dimensions of the recess being chosen so that structure members of different thickness can be connected together as a result of the second jaw device being pressed non-positively (i.e. by force-locking) against the intermediate part.

Accordingly a mounting for rigidly connecting at least two structure members is provided in a simple manner since no intermediate gripping elements of resilient material are used. By appropriate choice of the dimensions of the recess, it is, all the same, possible to effect the connection of structure members within a determined range of thicknesses since the jaw surfaces on the second jaw device are positioned by the intermediate part and the recess. By the use of an intermediate part of predetermined size, furthermore, the distances between the individual structure members are kept equal so that no differences of parallelism can arise.

The present invention furthermore renders possible particularly economical production of mountings since they consist of a small number of individual parts.

In one embodiment of the invention, the intermediate part can be made in one piece with the first jaw member whereby a further simplication and still more economical production of the mounting are rendered possible.

The first jaw member may consist of an angled piece. Particularly advantageous angles are 90°, 120°, 135° and 180°.

In a further embodiment of the mounting for connection of three elements, the second jaw device may be divided into two equal jaw members so that, between these further jaw members, there remains an opening for fixing a further structure member.

For connecting four elements, the present invention can be realized in a particularly advantageous manner if the intermediate part is a prism of square cross-section to the longitudinal sides of which four equal jaw members are fixed.

Thereby, individual panels or like structure members can be removed independently of the remaining structure members.

For the connection of three elements, the present invention can be realized advantageously if the intermediate part is a prism of pentagonal cross-section and, if the jaw device consists of two further jaw members having recesses spanning two non-adjacent faces of the prism. Then the jaw surfaces may be arranged to hold two panels perpendicular to one another and a third panel at 135° to each of the other two panels.

In order to achieve safe and rigid connection of the parts of the mounting to one another, at least one screw is preferably used.

As can be seen, the technical progress and the inventive contents of the object of the invention are assured by the new individual features as well as, particularly, by combination and sub-combination of all features used.

DESCRIPTION OF THE DRAWINGS

In order that the invention may be clearly understood and readily carried into effect mountings in accordance therewith will now be described by way of example with reference to the accompanying drawings, in which:

As shown in FIG. 1, a mounting consists of a jaw member 1, an intermediate part 2 formed thereon and of a jaw device 3. The jaw device 3 is pressed against the intermediate part 2 and accordingly against the jaw member 1 by means of a screw on the axis shown by a chain line but not shown in detail, the screw head being countersunk in an opening 8, so that two wall panels 5 situated between the jaw member 1 and jaw device 3 with their edges against the intermediate part 2 are connected together rigidly at an angle of 180° and with no possibility of movement.

The jaw device 3 furthermore comprises a recess 4 complementary with the intermediate part 4 which assures the location and the securing of the jaw device without distortion.

Figure 1:
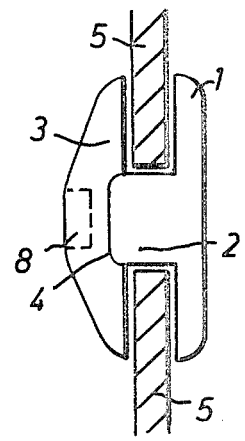
FIG. 1 shows a top view of a mounting for connecting two wall panels at an angle of 180°.
Figure 2:
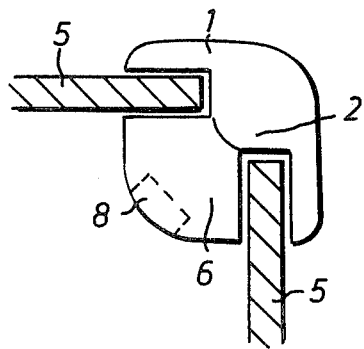
FIG. 2 shows a top view of a mounting for connecting two wall panels at an angle of 90°.

FIG. 2 shows a mounting for connecting two wall elements 5 at an angle of 90°. The jaw member 1 thereof is of angular shape and forms one piece with the intermediate part 2. The fixation of wall panels 5 is effected by pressing a jaw device 6 against the wall panels 5 and against the intermediate part 2. The jaw device 6, as shown in FIG. 2, comprises two side jaw surfaces facing the wall panels which include an angle of 90°. The jaw device 6 furthermore comprises a recess 4 for locating the jaw device on the intermediate part 2.

Figure 3:
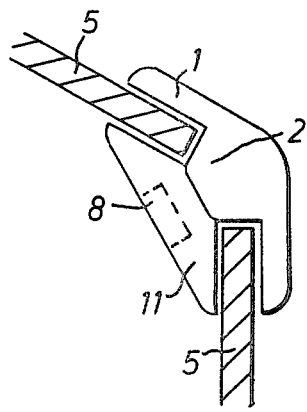
FIG. 3 shows a top view of a mounting for connecting two wall panels at an angle of 120°.

The mounting shown in FIG. 3 for connecting two wall panels at an angle of 120° is identical in principle with the mounting shown in FIG. 2. The only difference consists in that the jaw member 1 has an angle of 120° and in that a jaw device 11 is provided, the jaw surfaces of which, facing the wall panels 5, form with each other an angle of 120°.

Figure 4:
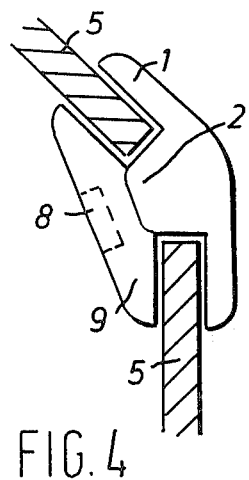
FIG. 4 shows a top view of a mounting for connecting two wall panels at an angle of 135°.

The mounting shown in FIG. 4 for connecting two wall panels at an angle of 135° is identical in principle with the mounting shown in FIG. 3. The only difference consists in that the jaw member 1 has an angle of 135° and in that there is provided a jaw device 9 the jaw surfaces of which, facing the wall panels 5, form with each other an angle of 135°.

Figure 5:
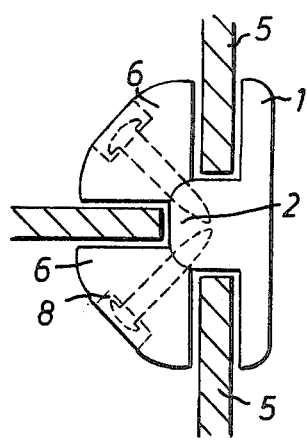
FIG. 5 shows a top view of a mounting for connecting three wall panels at angles of 90° and 180° respectively.

FIG. 5 shows a mounting for connecting three wall panels 5 at angles of 90° and 180°, respectively. This mounting comprises a jaw member 1 an intermediate part 2 formed thereon as well as a jaw device comprising two jaw members 6 fixed on the intermediate part. The jaw members 6 are identical with the jaw member 6 shown in FIG. 2. As can be seen, individual wall panels 5 can be removed independently of the remaining wall panels by releasing one of the jaw members.

Figure 6:
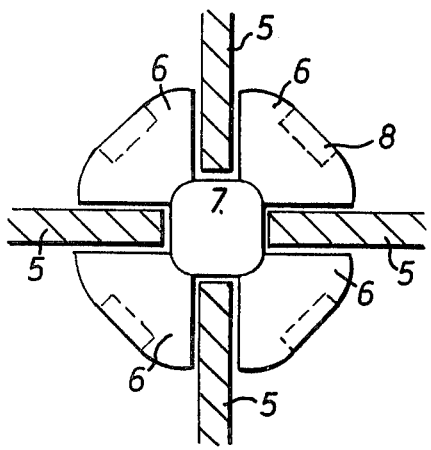
FIG. 6 shows a top view of a mounting for connecting four wall panels at angles of 90°.

FIG. 6 shows a mounting for connecting four wall panels 5 at angles of 90°. The mounting comprises a prism 7 of square cross-section on each of the longitudinal sides of which there is fixed a jaw member 6 by means of screws (not shown) on axes shown by chain lines. The individual wall panels 5 are fixed and held between the jaw members 6.

Figure 7:
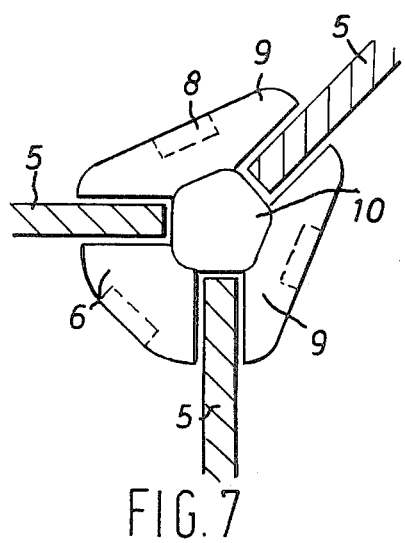
FIG. 7 shows a top view of a mounting for connecting three wall panels at angles of 90° and 135° respectively.

The mounting for connecting three wall panels 5 shown in FIG. 7 consists of a prism 10 of pentagonal cross-section, of two jaw members 9 fixed on non-adjacent faces of the prism 10 and of a jaw member 6 having a surface interfitting with one corner of the prism. Each of the jaw members comprises a recess 4 by means of which the location of the jaw member on the prism 10 is assured. The jaw members 9, by analogy with the arrangement of FIG. 4, form an angle of 135°. Between the jaw members 9, jaw surfaces thereon engage a wall panel opposite the jaw member 6.

The jaw member 6 has an angle of 90°. Between the partial jaw member 6 on the one hand and the jaw members 9 on the other hand, two further pairs of jaw surfaces for lodging two further wall panels at an angle of 90° are formed.

Figure 8:
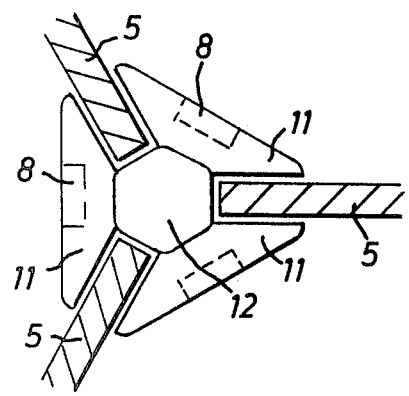
FIG. 8 shows a top view of a mounting for connecting three wall panels at angles of 120°.

FIG. 8 shows a mounting for connecting three walls 5 at an angle of 120°. This mounting consists of a prism 12 of hexagonal cross-section and three jaw members 11 arranged symmetrically around the prism on three non-adjacent faces of the prism. Each of the jaw members 11 comprises a recess for locating the jaw member on the prism 12. The individual jaw members 11 are fixed on the prism 12 by means of screws not shown in detail, countersunk in recesses 8.

As can be seen, the choice of suitable dimensions for the recesses 4 of the individual jaw members determines the thickness of the wall elements to be connected. I claim:

1. A mounting for detachably connecting juxtaposed ends of first, second and third panels radiating away from the mounting, said mounting comprising:

a first generally T-shaped jaw member including a pair of oppositely extending arms formed with a first pair of spaced continuous planar jaw surfaces positioned to engage respective faces on one side of the first and second panels adjacent to the ends thereof and a base portion formed integrally with said jaw member and located between the ends of said first pair of panels, said base portion including rounded corner edges, a pair of further, wedge-shaped jaw members, each having one jaw surface positioned to engage, respectively, the faces of said first and second panels on opposite sides of the respective panels from the faces engaged by said first pair of spaced jaw surfaces, each of said further jaw members having a further jaw surface positioned to engage the third panel, each of said further wedge-shaped jaw members including a rounded recessed portion which engages and interfits with the reciprocally shaped rounded corner edges of the base portion of the first jaw member and constitutes the sole means for accurately determining the separation of said further wedge-shaped jaw members from the first T-shaped jaw member so as to match the thickness of the first and second panels located between the further jaw members and said first jaw member, said base portion of said T-shaped jaw member being positioned to engage the ends of all of the three panels which radiate from the mounting, and means for releasably securing said further jaw members to said base portion of said first jaw member comprising a pair of screws having the heads thereof counter-sunk in respective ones of said further jaw members and extending through said rounded corner edges of said first jaw member.

* * * * *